(12) United States Patent
Sinton

(10) Patent No.: US 12,069,344 B2
(45) Date of Patent: *Aug. 20, 2024

(54) AUTOMATED VIDEO-PREROLL METHOD AND DEVICE

(71) Applicant: Beachfront Media LLC, Ormond Beach, FL (US)

(72) Inventor: Frank Sinton, Ormond Beach, FL (US)

(73) Assignee: Beachfront Media LLC, Ormond Beach, FL (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/182,052

(22) Filed: Feb. 22, 2021

(65) Prior Publication Data

US 2022/0014823 A1 Jan. 13, 2022

Related U.S. Application Data

(63) Continuation of application No. 16/160,922, filed on Oct. 15, 2018, now Pat. No. 10,932,008, which is a continuation of application No. 12/710,291, filed on Feb. 22, 2010, now Pat. No. 10,104,436.

(60) Provisional application No. 61/154,724, filed on Feb. 23, 2009, provisional application No. 61/154,729, filed on Feb. 23, 2009.

(51) Int. Cl.
*H04N 21/482* (2011.01)
*H04N 21/262* (2011.01)
*H04N 21/431* (2011.01)

(52) U.S. Cl.
CPC ..... *H04N 21/482* (2013.01); *H04N 21/26258* (2013.01); *H04N 21/4312* (2013.01); *H04N 21/4825* (2013.01)

(58) Field of Classification Search
CPC ......... H04N 21/26258; H04N 21/4312; H04N 21/482; H04N 21/4825
See application file for complete search history.

(56) References Cited

U.S. PATENT DOCUMENTS 7,324,555 B1 1/2008 Chen et al.
7,734,725 B2 * 6/2010 Tilt, IV ................... H04L 67/06
709/224

(Continued)

OTHER PUBLICATIONS

"CRN—Technology News for Solution Providers and the IT Channel", at http://www.crn.com/retail/214600126;jessonid= O4GWQHMGYQC5NQE1GHPCKHWATMY32JVN; pp. 1-4.

(Continued)

*Primary Examiner* — Daniel W Parcher
(74) *Attorney, Agent, or Firm* — Haynes Beffel & Wolfeld LLP; Ernest J. Beffel, Jr.; Jason Liao

(57) ABSTRACT

We disclose a technology implemented on a computer that automates sequential display of messages, typically videos, which appear on a user's display screen in the same place or in overlapping areas of a single window in a browser. In particular, this relates to displaying a message that arbitrarily may be in a different format than a requested video, with the first message programmed to appear before or after the requested video in substantially the same area of the user's display screen where the requested video will appear or has appeared. The message and the requested video are sequenced without any need to match formats or players used.

20 Claims, 7 Drawing Sheets

(56) References Cited

U.S. PATENT DOCUMENTS

| | | | |
|---|---|---|---|
| 7,933,338 B1 | 4/2011 | Choudhry et al. | |
| 7,983,915 B2 | 7/2011 | Knight et al. | |
| 8,364,671 B1 | 1/2013 | Sinton et al. | |
| 8,856,113 B1 | 10/2014 | Sinton et al. | |
| 9,769,544 B1* | 9/2017 | Pau | H04N 21/254 |
| 9,990,439 B2* | 6/2018 | Sharma | H04L 67/02 |
| 2002/0038456 A1 | 3/2002 | Hansen et al. | |
| 2002/0133247 A1* | 9/2002 | Smith | H04N 21/23424 |
| | | | 370/360 |
| 2002/0138641 A1* | 9/2002 | Taylor | H04N 21/25858 |
| | | | 348/E7.071 |
| 2003/0009452 A1* | 1/2003 | O'Rourke | G06F 16/4387 |
| 2003/0023973 A1* | 1/2003 | Monson | H04N 21/458 |
| | | | 705/14.69 |
| 2003/0145338 A1* | 7/2003 | Harrington | H04N 21/8193 |
| | | | 725/86 |
| 2004/0003102 A1* | 1/2004 | DuVall | H04L 65/1101 |
| | | | 709/231 |
| 2004/0045030 A1* | 3/2004 | Reynolds | H04L 65/612 |
| | | | 725/110 |
| 2004/0199603 A1* | 10/2004 | Tafla | G06F 16/957 |
| | | | 707/E17.119 |
| 2004/0239703 A1* | 12/2004 | Angelica | G06Q 30/0277 |
| | | | 715/962 |
| 2005/0060311 A1 | 3/2005 | Tong et al. | |
| 2005/0114430 A1* | 5/2005 | Zheng | G06Q 30/02 |
| | | | 709/200 |
| 2005/0256867 A1 | 11/2005 | Walther et al. | |
| 2006/0294071 A1 | 12/2006 | Weare et al. | |
| 2007/0112630 A1* | 5/2007 | Lau | G06Q 30/0264 |
| | | | 705/14.1 |
| 2007/0150612 A1* | 6/2007 | Chaney | H04L 65/4015 |
| | | | 709/231 |
| 2007/0244862 A1 | 10/2007 | Adams et al. | |
| 2007/0244929 A1* | 10/2007 | Huang | G06Q 30/0277 |
| | | | 707/999.102 |
| 2007/0250901 A1 | 10/2007 | McIntire et al. | |
| 2007/0266022 A1 | 11/2007 | Frumkin et al. | |
| 2007/0282818 A1* | 12/2007 | Lynn | G06F 16/955 |
| | | | 707/E17.112 |
| 2008/0005348 A1* | 1/2008 | Kosiba | H04N 21/25816 |
| | | | 709/231 |
| 2008/0104267 A1* | 5/2008 | Dawson | H04L 65/612 |
| | | | 709/227 |
| 2008/0133495 A1 | 6/2008 | Fischer | |
| 2008/0147214 A1* | 6/2008 | Lee | G06F 16/48 |
| | | | 707/E17.009 |
| 2008/0154889 A1 | 6/2008 | Pfeiffer | |
| 2008/0165281 A1* | 7/2008 | Davis | G11B 27/322 |
| 2008/0172615 A1 | 7/2008 | Igelman et al. | |
| 2008/0239169 A1* | 10/2008 | Moon | H04N 21/4314 |
| | | | 386/E5.052 |
| 2008/0249798 A1 | 10/2008 | Tulshibagwale | |
| 2008/0270138 A1 | 10/2008 | Knight et al. | |
| 2008/0270344 A1 | 10/2008 | Yurick et al. | |
| 2008/0276272 A1* | 11/2008 | Rajaraman | G06Q 30/02 |
| | | | 725/37 |
| 2008/0281689 A1* | 11/2008 | Blinnikka | G06Q 30/02 |
| | | | 705/14.61 |
| 2008/0288983 A1* | 11/2008 | Johnson | H04N 21/812 |
| | | | 725/46 |
| 2008/0307454 A1* | 12/2008 | Ahanger | H04N 21/854 |
| | | | 725/36 |
| 2008/0320512 A1* | 12/2008 | Knight | H04N 21/4782 |
| | | | 725/32 |
| 2008/0320531 A1 | 12/2008 | Kim et al. | |
| 2009/0006388 A1 | 1/2009 | Ives et al. | |
| 2009/0006962 A1 | 1/2009 | Ives et al. | |
| 2009/0019034 A1* | 1/2009 | Franks | G06F 16/78 |
| | | | 707/999.005 |
| 2009/0049052 A1* | 2/2009 | Sharma | G06F 16/958 |
| 2009/0133059 A1 | 5/2009 | Gibbs et al. | |
| 2009/0157500 A1* | 6/2009 | Ames | G06Q 30/0264 |
| | | | 715/764 |
| 2009/0182889 A1* | 7/2009 | Hurst | H04L 65/80 |
| | | | 709/231 |
| 2009/0216683 A1* | 8/2009 | Gutierrez | G06Q 50/188 |
| | | | 705/14.73 |
| 2009/0228897 A1* | 9/2009 | Murray | G06F 9/544 |
| | | | 719/313 |
| 2009/0228919 A1* | 9/2009 | Zott | H04N 7/17318 |
| | | | 725/51 |
| 2009/0307722 A1* | 12/2009 | Gross | H04N 21/25883 |
| | | | 725/35 |
| 2010/0037138 A1* | 2/2010 | Shcherbakov | H04L 67/02 |
| | | | 715/716 |
| 2010/0153831 A1* | 6/2010 | Beaton | G06Q 30/02 |
| | | | 715/201 |
| 2010/0235765 A1* | 9/2010 | Worthington | G06F 16/957 |
| | | | 715/760 |
| 2013/0036201 A1* | 2/2013 | Mclaughlin | H04N 21/26258 |
| | | | 709/219 |
| 2013/0166303 A1 | 6/2013 | Chang et al. | |

OTHER PUBLICATIONS

"Everything You Ever Needed To Know About Video Embedding", at http://www.hunlock.com/blogs/Everything_You_Ever_Needed_To_Know_About_Video_Embedding; pp. 1-9.

"Javascript and div's with style.display=none or block bugging in IE 5.5 and 6.0", at http://bytes.com/groups/ javascript/458475-javascript-divs-style-display-none-block-bugging-ie-5-5-6-0-a; pp. 1-6.

"Javascript Div Collapse Style Using Display None", at http://programming.top54u.com/post/Javascript-Div-Collapse-Style-Using-Display-None.aspx; pp. 1-5.

Tiffany Armstead, Laryssa Kundanmal, Rod Stovall, H. Tom Wells Streaming Audio and Video Technology Patterns of Electronic Commerce Oct. 8, 1999 7 pages.

Multiple YouTube Videos on a Page Jul. 27, 2007 2 pages.

freecodesource.com Create a Music Video Playlist 2 pages.

Mobilefish A tutorial about Cascading Style Sheet (CSS). Div containers examples. Dec. 28, 2006 and May 27, 2007 13 pages.

Interactive Advertising Bureau IAB Platform Status Report: A Digital Video Advertising Overview Jan. 2008 14 pages.

Interactive Advertising Bureau Digital Video In-Stream Ad Format Guidelines and Best Practices Released May 2008 17 pages.

"CRN—Technology News for Solution Providers and the IT Channel", at http://www.crn.com/retail/214600126; iessonid=O4GWQHMGYQC5NQE1GHPCKHWATMY32JVN; pp. 1-4.

* cited by examiner

General Layout of
http://www.mefeedia.com/entry/video-meat-feat-ostrich-makes-biggest-sandwich/11939995

Figure 2  Facsimile of
http://www.mefeedia.com/entry/video-meat-feat-ostrich-makes-biggest-sandwich/11939995

```
<table width="970" border="0" align="center" cellpadding="0" cellspacing="0" bgcolor="#FFFFFF">
<tbody>
<tr>
    <td height="39" colspan="3" align="left" valign="top" >
    <!-- load breadcrumbs breadcrumbs.htm -->
    <!-- load brokenvideo broken_entry.html -->
    <h1 class="h1homepage" align="left">
    <a href="/" style="color:#0033FF">Video</a>
    <span class="breadcrumb">> </span>
    <a href="/feeds/37964/associated-press" style="color:#0033FF">Associated Press</a>
    <span class="breadcrumb">></span>
            Video: Meat Feat: Ostrich Makes Biggest Sandwich
    </h1></td> </tr>                                                    ———— 422
                                                            ———— 449
<tr valign="top">
    <td align="left" valign="top" width="512">
    <table width="510" height="250" border="0" cellpadding="0" cellspacing="0" bgcolor="#CCCCCC" >
    <tbody>
    <tr>
    <td align="left" valign="top">
    <script type="text/javascript" src="/functions.js"></script>      ———— 451
    <script language="javascript" type="text/javascript">
    function getVideo() {
        hidediv("ad");showdiv("VideoEntryDiv");          ———— 453
    }
    var content_width = 510;// 400;//300
    var content_height = 420;//326;//240
    </script>                                                    ———— 457
    <div id="ad" name="ad" style="width:510px; background:#000000" >
    <center> <div style ="align:center; vertical-align:top; color: #CCCCCC; font-family: Tahoma; font-size: 10px;"> The video will begin shortly. </div> </center>
        <script language="JavaScript" type="text/javaScript">
        if (typeof(gnm_ord)=='undefined') gnm_ord=Math.random()*1000000000000000;
            if (typeof(gnm_tile) == 'undefined') gnm_tile=1;
            document.write('<scr'+'ipt language="JavaScript" src="http://n4403ad.doubleclick.net/adj/gn.mefeedia.com/video;sect=video;sz=5x5;type=preroll;tile='+(gnm_tile++)+';ord='+ gnm_ord + '?' type="text/javascript" ></scr' + 'ipt>');
        </script>
    </div>
```

Figure 4A

```
<noscript>
  <div id="VideoEntryDiv" name = "VideoEntryDiv" style=""> ———— 457
</noscript>
<object classid="clsid:D27CDB6E-AE6D-11cf-96B8-444553540000"  codebase="http://download.macromedia.com/pub/shockwave/cabs/flash/swflash.cab#version=6,0,0,0" width="510" height="420">
  <param name=movie value="http://eplayer.clipsyndicate.com/cs_api/get_swf?swfHome=eplayer.clipsyndicate.com&csEnv=p&wpid=3933&va_id=722307&cpt=8">
  <param name="allowfullscreen" value="true" >
  <param name=quality value=high>
  <param name="FlashVars" value="autoplay=1&autostart=1&fs=1" >
  <param name="wmode" value="transparent"> ———— 459
  <param name="id" value="video">
  <embed id="video" src="http://eplayer.clipsyndicate.com/cs_api/get_swf?swfHome=eplayer.clipsyndicate.com&csEnv=p&wpid=3933&va_id=722307 & amp;cpt=8" FlashVars="autoplay=1&autostart=1&fs=1" enablehref="false" quality=high wmode="transparent" pluginspage="http://www.macromedia.com/shockwave/download/index.cgi?P1_Prod_Version=ShockwaveFlash" type="application/x-shockwave-flash" width="510" ———— 461
  height="420" allowfullscreen="true" ></embed>
</object>
</div>
<script language="javascript">
if(typeof(sprezzatura)=="undefined") {
    getVideo();
}
else {
    //sprezzatura = 18000; ———— 463
    window.setTimeout("getVideo()",sprezzatura); ———— 465
}
</script>
</nobr> </div></td> </tr> </tbody> </table>
```

Figure 4B

```
function hidediv(id) {
        //safe function to hide an element with a specified id
        if (document.getElementById) { // DOM3 = IE5, NS6
                document.getElementById(id).style.display = 'none';
        }
        else {
                if (document.layers) { // Netscape 4
                        document.id.display = 'none';
                }
                else { // IE 4
                        document.all.id.style.display = 'none';
                }
        }
} function showdiv(id) {
        //safe function to show an element with a specified id if (document.getElementById) { // DOM3 = IE5, NS6
                document.getElementById(id).style.display = 'block';
        }
        else {
                if (document.layers) { // Netscape 4
                        document.id.display = 'block';
                }
                else { // IE 4
                        document.all.id.style.display = 'block';
                }
        }
}
```

Figure 5

Figure 6
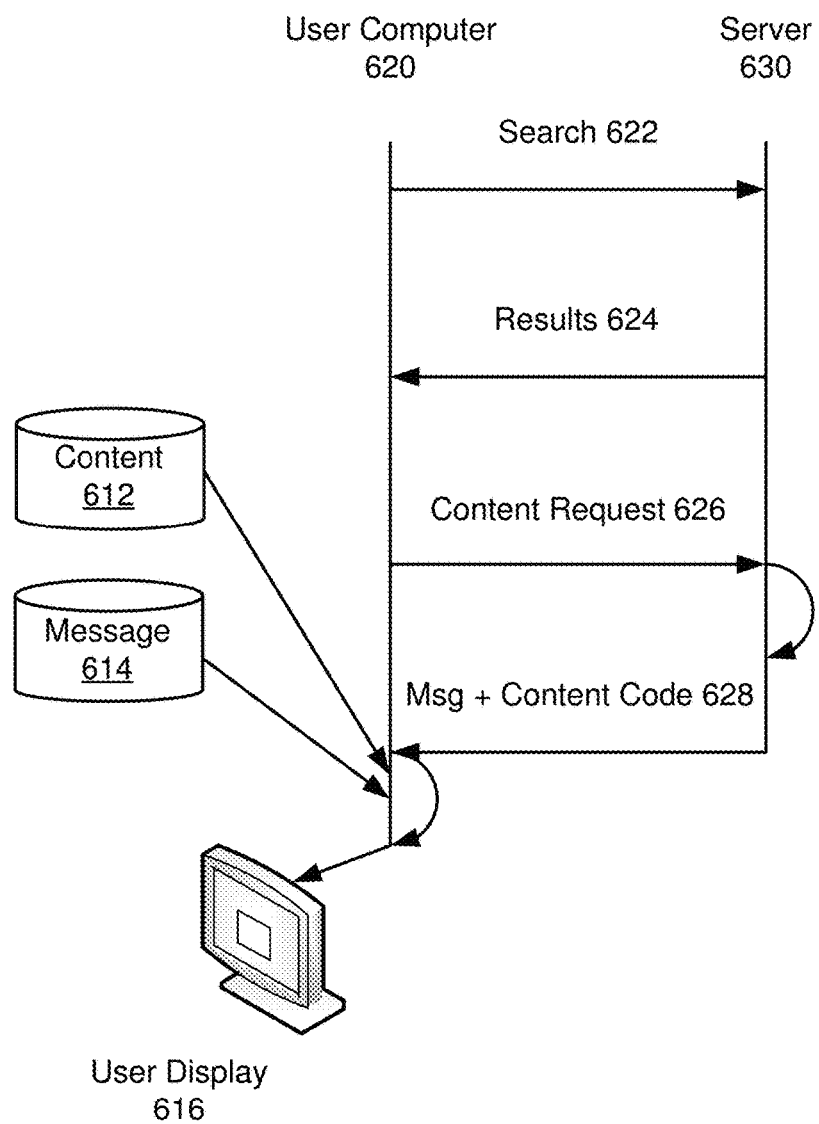
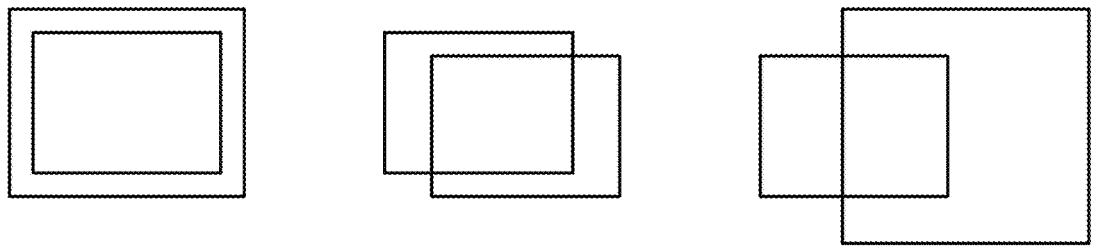
Figure 7

AUTOMATED VIDEO-PREROLL METHOD AND DEVICE

RELATED APPLICATION

This application is a continuation of U.S. application Ser. No. 16/160,922 filed 15 Oct. 2018, which is a continuation of U.S. application Ser. No. 12/710,291 filed 22 Feb. 2010, now U.S. Pat. No. 10,104,436 issued 16 Oct. 2018, which claims the benefit of U.S. Provisional Application Nos. 61/154,729 and 61/154,724, both filed 23 Feb. 2009, all of which are hereby incorporated by reference.

BACKGROUND OF THE INVENTION

We disclose a technology implemented on a computer that automates sequential display of messages, typically videos, which appear on a user's display screen in the same place or in overlapping areas of a single window in a browser. In particular, this relates to displaying a message that arbitrarily may be in a different format than a requested video, with the first message programmed to appear before or after the requested video in substantially the same area of the user's display screen where the requested video will appear or has appeared. The message and the requested video are sequenced without any need to match formats or players used.

There are thousands or millions of ways to build a web page. There are a even more alternatives, beyond building a web page, for presenting a user sequentially with a message and then a video. One conventional approach uses software such as Apple's iMovie® or a professional editing suit to prepend a message to a video and render it as a single file in the desired format. Another conventional approach uses a web page authoring package such as Apple's iWeb® to compose a page. A web authoring package typically renders the content to a web-optimized format that it can conveniently display. For instance, a group of photo albums may be rendered so that rolling a mouse pointer over a thumbnail that represents an album scrolls through thumbnails of some or all of the album content. Instead of following these approaches or other conventions, these inventors developed the approach disclosed below for sequentially displaying messages to a user.

The opportunity to build a better mousetrap is ever present. In addition, an opportunity was recognized by these inventors to develop a better technology for sequentially displaying messages in a single browser window, such as a pair of videos or a message and a video. Better, more easily configured and controlled, more resilient and transparent components and systems may result.

SUMMARY OF THE INVENTION

We disclose a technology implemented on a computer that automates sequential display of messages, typically videos, which appear on a user's display screen in the same place or in overlapping areas of a single window in a browser. In particular, this relates to displaying a message that arbitrarily may be in a different format than a requested video, with the first message programmed to appear before or after the requested video in substantially the same area of the user's display screen where the requested video will appear or has appeared. The message and the requested video are sequenced without any need to match formats or players used. Particular aspects of the present invention are described in the claims, specification and drawings.

BRIEF DESCRIPTION OF THE DRAWINGS

FIGS. 4A, 4B and 5 are program code excerpts that illustrate using <div> and manipulating visibility of containers that are positioned to appear in the same place on a user's display monitor. These code samples are excerpted from the same McFeedia™ web page as depicted in FIGS. 1-2.

FIG. 6 depicts user-server interactions and some program operations.

FIG. 7 depicts some of the configurations of overlapping display containers.

DETAILED DESCRIPTION

Figure 1:
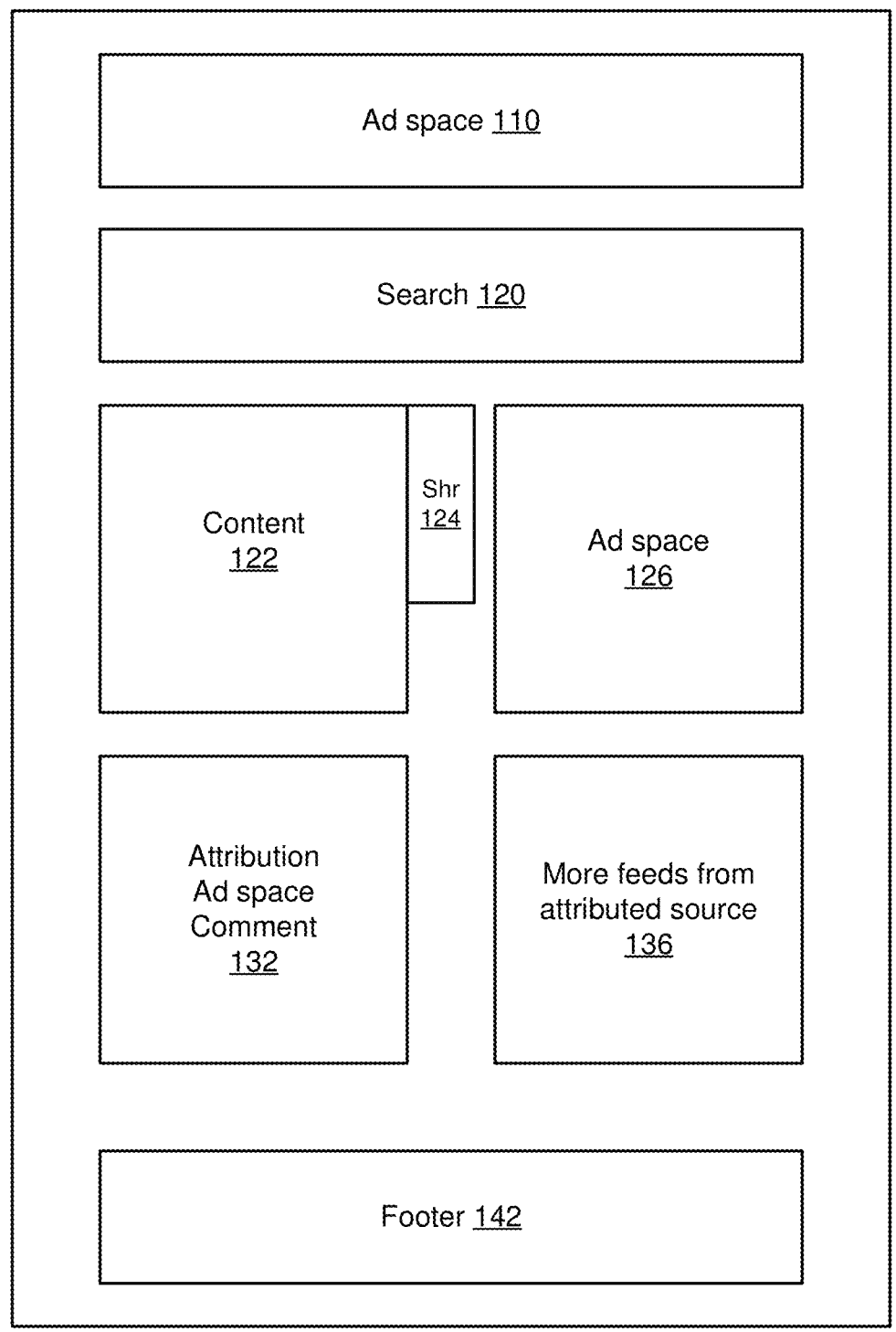
FIG. 1 depicts the general layout of a MeFeedia's web page used to display requested content. A facsimile of a display page from the same site appears in FIG. 2.

The following detailed description is made with reference to the figures. Preferred embodiments are described to illustrate the present invention, not to limit its scope, which is defined by the claims. Those of ordinary skill in the art will recognize a variety of equivalent variations on the description that follows.

Users of the Internet often search for content. Advertising supported search engines display sponsored links along side search results, as Google does. Alternatively, advertising messages are sometimes displayed before the desired content, often with one browser window overlaying another, at least when a pop-up window blocker is not blocking the second window from appearing. Overlayed advertising pages are sometimes called "interstitial pages." In one sample interstitial implementation, encountered at Channel Web, http://www.crn.com/retail/214600126jsessionid=O4GWQHMGYQC5NQE1GHPCKHWAT MY32JVN, on or about Feb. 26, 2009, the interstitial page encountered covered much of the screen and obscured the requested content for about five seconds. A later advertising style encountered at the same URL has a crawling banner in the bottom left corner of the screen, which expands upwards into an animated ad upon a cursor roll-over.

The technology disclosed facilitates displaying a message and then selected content, in the same place on a user's screen, in the same browser window. Two different formats of message can be displayed one after the other. Typically, the selected content is a video, so the user will have some patience for viewing a sponsor's message. The sponsor's message can be another video, a series of images, an animation, or a single fixed message. Two different players can be required by the different messages. For instance, the first message could use a Quicktime® player and the video content could use a Shockwave Flash® player. In one prominent scenario, a video pre-roll shows before requested video content. the video pre-roll and the requested video have substantially the same size and are displayed in substantially the same position as one another, potentially creating the impression that they have been combined into a single video and are running in the same video player.

By substantially the same size, we mean that the area that the larger video effectively fills is in the range of 100 to 120 percent, or 100 to 125 percent of the area of the smaller video. Alternatively, the larger video area could be 150 percent of the smaller video area. By displayed in substantially the same position, we mean that the center of larger video is offset from the center of the smaller video by less than or equal to one-third of the distance from the center to the edge of the smaller video area.

Another criteria for judging whether the messages are displayed in the same place is whether the viewer sees both videos without the web page reflowing or without having to hunt visually for the center of the second video, after watching the first video.

FIG. 1 depicts the general layout of a MeFeedia's web page used to display requested content. A facsimile of a display page from the same site appears in FIG. 2. The general layout can be used to understand the facsimile, much of which is too small to read in detail. In FIG. 1, the top page area 110 is used for ad space. In the facsimile, ads by Google appear. The next area 120 is used for follow-on searches, so that the user does not have to return to a search home page to conduct their next search.

Content, which is the focus of much of this disclosure, appears in area 122. As shown in the facsimile, a pre-roll video and selected video content are displayed in the same content area 122. In other embodiments, the selected content might be larger (or smaller) than the sponsor's message. Or, the selected content might be offset from the message. In general, the message and content are positioned so that the user maintains their focus on particular part of the screen and need not hunt or refocus their attention to view the sequentially displayed messages.

Additional areas appear on the page for: sharing 124 the content, as by e-mailing or posting it; additional ads 126, 132; attribution of the selected content 132; additional feeds from the attributed source or a sponsored source 136; and a footer 142. There are many ways that areas of the web page can be used, in combination with the sequential display technology disclosed.

Figure 3:
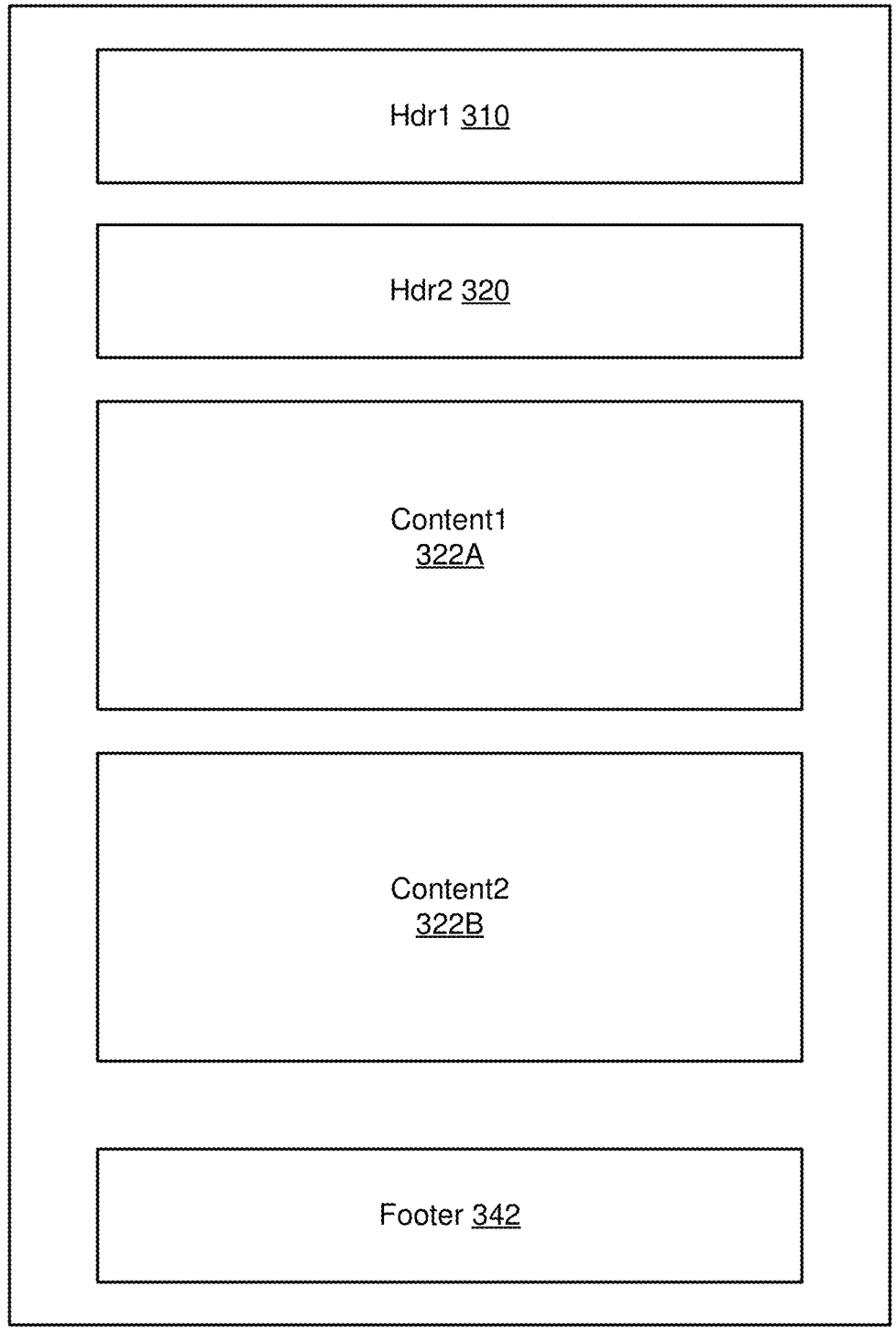
FIG. 3 depicts a typical flow for a simplified page.

Display mark-up languages such as HTML and XHTML provide language elements and leave it to the programmer's imagination to find a good use for them. FIG. 3 depicts a typical display flow of a simplified mark-up page. Headers 310, 320, content 322A, 322B and a footer 342 flow sequentially. These sections are separated, according to mark-up language convention, by some white space. Optional language features support floating an element, instead of flowing it sequentially with other elements. Other elements may flow around the floated element, depending on where it is positioned. In general, the elements of display mark-up languages are designed to organize the page, to keep content in separate, non-overlapping areas.

One of the elements of HTML is the <div> tag. A <div> is a structural element that allows display formatting elements (and nested structural elements) to be grouped and assigned attributes as a group. In this application, we sometimes refer to the <div> as a container, because it groups or contains other language elements. One of the attributes that can be assigned to a <div> makes contained mark-up language elements display or not, makes content contained in the <div> visible or invisible. Typical values for this attribute are 'block', which is visible, and 'none', which is invisible and is ignored for flowing the page. The <div> element display='none' property has many uses. The article, "Everything You Ever Needed To Know About Video Embedding", at http://www.hunlock.com/blogs/Everything_You_Ever_Needed_To_Know_About_Video_Embedding, describes encapsulating an embedded video in a named <div> to allow a function to halt download of the video and reset the embedded video to its beginning. The article, "Javascript and div's with style.display=none or block bugging in IE 5.5 and 6.0", at http://bytes.com/groups/javascript/458475-javascript-divs-style-display-none-block-bugging-ie-5-5-6-0-a, describes a frustrating bug in the implementation of <div> processing in Internet Explorer™. The article "Javascript Div Collapse Style Using Display None", at http://programming.top54u.com/postaavascript-Div-Collapse-Style-Using-Display-None.aspx, gives an elegant example of collapsing an outline by hiding lower levels of the outline from display. None of these examples hide one container and make another container appear in its place.

Figure 2:

These inventors discovered a new and different use for the <div> container and visibility attribute. They discovered that initially hiding a second container, displaying video in the first container, then hiding the first container and activating the second one facilitates sequential display of video clips, even when the video clips were retrieved from different sources and required different players. FIGS. 4A, 4B and 5 are program code excerpts that illustrate using <div> and the disclosed manipulation of visibility of containers that are positioned to appear in the same place on a user's display monitor. These code samples are excerpted from the same McFeedia™ web page as depicted in FIGS. 1-2.

In FIG. 4A, the <h1> tag 422 contains the title, "Meat Feat: Ostrich Makes Biggest Sandwich", that announces the content 122.

The src="/functions.js" 451 points to a library that holds the functions in FIG. 5.

The inline function getVideo( ) 453 supports hiding a <div> named "ad" and showing, in its place, a <div> named "VideoEntryDiv".

Next, the "ad" <div> 455 references a DoubleClick® ad source, which is one place that a video or still ad can be obtained to show before requested video content.

The "VideoEntryDiv" 457 references requested video content. This is useful in a video search environment, for instance, when a user has visited MeFeedia's search page. In such an environment, the user submits a search request. Among the results responsive to a user's search was "Meat Feat: Ostrich Makes Biggest Sandwich." The user requested the Ostrich video. MeFeedia's server sent the user's computer program code that includes the VideoEntryDiv and a reference in the <div> to content at clipsyndicate.com 459, where the Ostrich video resided. As the code reveals, this video content uses the Shockwave Flash player 461.

Comparing attributes of the "ad" 455 and "VideoEntryDiv" 457, one sees that both <div> elements are given the same width. They are positioned in the same table detail <td> tag 449, so they will appear in the same place when the first container is hidden and the second container activated. The requester's attention is focused in one place for both the message and the requested video content.

An unnamed inline script 465 invokes getVideo( ) after a timer expires. The timer in this code sample allows the ad content to run for 18 seconds 463. When the time expires, the getVideo( ) function uses safe functions, reproduced in FIG. 5, to hide the first container and show the second container. The <div> elements' display attributes are processed by the display mark-up language effectively to substitute the second container in place of the first container. In this sample code, the containers are close enough in size that the web page is not rearranged, its flow is undisturbed when the second container is substituted for the first.

FIG. 5 includes sample routines for safely toggling the display status of a <div>. Safe functions are used to compensate for differences among browser object implementations. These functions detect the appropriate object for a particular browser and set the display attribute to 'none' or 'block', depending on whether a particular object is being hidden or displayed.

We also can describe our sequential display of messages using a message flow diagram. FIG. 6 depicts user-server interactions and some program operations. This diagram generalizes the process involved in hiding and displaying containers, without limitation to use of the <div> element. The user, working at the user computer 620, optionally searches for content, such as video content, by sending a request 622 to a server 630. The server performs a search and returns the results 624. The user selects among the search results or otherwise requests content 626. Upon receiving the content request, the server combines a template for display with a reference to the requested content, which may be in a content store 612 managed or maintained by a third party. The server can select a message for the user, such as a pre-roll or post-roll video advertisement, or select a campaign from which messages will be presented or a message source, such as an ad provider. The ad provider can be a particular ad service, an aggregator of ads, or an optimizer of ad serving. The server sends 628 the template, a link consistent with the message selection, and a link to the requested content.

In some embodiments, the message for the user has a known length of time for display that can be used to set a timer. The timer value represents the time that the message will be visible before the requested content replaces it. Alternatively, a timer value could be supplied as a parameter when a message 614 is retrieved from a message source. Or, an end of message signal could trigger activation of the requested content. In some embodiments, the user could have an option of skipping the message and proceeding directly to the requested content. The message and requested content appear on the user display 616 in generally the same area of the display and in the same window.

On the user computer, a page of display mark-up code is received 628. The code formats the page so that both the message and requested content to appear in generally the same area of the user's display. The user's computer processes the code. The code also provides a reference for retrieving one or more messages 615. By "in generally the same area of the user's display," we mean that the message and requested content are in areas that at least overlap. Some configurations of overlapping display containers are depicted in FIG. 7. Preferably, switching the content displayed from the message to the requested content does not cause the overall display content to reflow or rearrange itself, as significantly reflowing the content could be distracting to the user.

The user's computer displays the message on the user display 616. A trigger is satisfied that causes a switch in displayed content. In one embodiment, a timer runs and triggers the switch from the message to the requested content. In another embodiment, a message is displayed until an end of message condition is detected (e.g., rolling a video) and the end of message triggers the switch. When the switch is triggered, the requested content becomes active. The message may be deactivated, made invisible or just covered, in whole or part, by the requested content, depending on language features supported by the browser.

More than two messages may be involved. For instance, messages may be triggered before and after the requested content. Or, if the requested content is substantial, such as a TV show, movie or other popular content, multiple messages may precede the requested content. Successive container can be positioned and made invisible or displayed in sequence, progressing pairwise from a container being displayed to the next container to be displayed.

Particular Embodiments

One embodiment of the technology disclosed, from the perspective of a server responding to a requester, is a method of automating sequencing of a requested video and a supplemental video that may be in different data formats and shown by a computer using different players. This method includes generating and storing in computer memory a program code that defines at least two containers on a web page of substantially the same size and position in which requested video content and supplemental video content are programmed to be shown. The code defines the two containers such that: one container is defined to show the supplemental video content in a first format using a first video-capable player; and another container is defined to show the requested video in a second format using a second video-capable player that is a different instantiation than the first player's instantiation. The order in which the videos play does not matter. For pre-roll of the supplemental video, the one container is the first container and for post-roll, the one container is the second container. Not confusing the one container with the first container, the video content in the first container is initially visible and video content in the second container is initially not visible. The method further includes configuring a first trigger in the program code to enable visibility of the second container, such that when the first trigger is satisfied, the second container becomes visible and the first container is behind the second container or becomes not visible. Responsive to a request to view the requested video, the method optionally includes sending the program code to the requester via a network, with separate links to the requested video and the supplemental video content in the two containers. IN some instances, the method will be useful without including the last step of sending the out the program code responsive to a video request.

In the method described, either from the server or the requestor perspective, the first and second containers are substantially the same size, alternatively if a larger of the first and second containers has an area in a range of 100 to 120 percent of an area of a smaller container; or the larger container has an area in a range of 100 to 125 percent of the area of a smaller container; or the larger container has an area in a range of 100 to 150 percent of the area of a smaller container.

In some embodiments, neither of the first and second containers cover more than half of a web page area of the web page on which the containers are positioned.

In a further aspect of the method, which can be combined with any of the aspects or embodiments above, the container for the supplemental video content has a size and position that leaves video selection controls and user response choices exposed on a web page on which the container are positioned.

Another aspect further includes dynamically specifying in the program code the link to the requested video, responsive to the receiving the request. Sometimes, the first trigger is a timer value. This timer value may be delivered with the program code or accessible to the program code, when run, from a source of whichever video plays first. Alternatively, the first trigger may be detection of the end of running whichever video plays first.

The video-capable players running in the first and second containers can be different players/codecs or instances of the same player/codec.

The method may be extended to both pre- and post-roll of supplemental videos, by generating the program code to further include defining a third container that shows content in a third format using a third player, setting a second trigger, such as a timer, timer value to enable visibility of the third container, and delivering said program code with the second trigger.

This server perspective of the method can be recast from a requester's perspective, including all of the embodiments, aspects and extensions that apply from the server's perspective. The receiver's method is useful for displaying a requested video and a supplemental video that may be in different data formats and shown by a computer using different players. The receiver's method includes requesting a video from a server via a network and receiving, storing in computer memory, and executing a program code. The program code defines at least two containers, one of the containers programmed to show the requested video and an other of the containers programmed to show a supplemental video. The code is programmed such that a first container is defined to show video content in a first format using a first player and a second container is defined to show video content in a second format using a second player. Without confusing the one container with a first container, as the two videos can play in any order, the first container is initially visible and the second container is initially not visible. The first and second containers are coded to display on a web page in substantially the same size and position. The program code further includes a first trigger to enable visibility of the second container, such that when the first trigger is satisfied, the second container becomes visible and the first container is behind the second container or becomes not visible. Optionally, the method includes displaying the requested video and the supplemental video content using the program code. The displaying is optional, as retrieving the code can be useful without running it.

In some instances, as explained from the server's perspective, the first trigger is a timer value.

Also as described above, the requested and supplemental video may be in different formats that use separate players to decode and display the different formats. Again, the features described from the server's perspective can generally be applied to the method when described from the requester's perspective.

The methods cast from the server and requester perspective have corresponding devices or systems. One is a server that serves code adapted to display a requested video and a supplemental video that may be in different data formats and shown by a computer using different players. This server includes a processor, memory, and a first module in the memory and running on the processor that generates program code that defines at least two containers. The code is generated by the module such that a first container is defined to show a first message in a first format using a first player and a second container is defined to show a requested video in a second format using a second player. The first container is initially visible and the second container is initially not visible. The first and second containers are coded to appear in generally the same area of a display monitor and in a same browser window when viewed by a requester. The program code further includes a first trigger to enable visibility of the second container, such that when the first trigger is satisfied, the second container becomes visible and the first container is behind or substantially covered by the second container or becomes not visible. The server optionally includes a second module adapted to send the program code to the requester via a network, with separate links to the requested video and to the supplemental video in the two containers. Sending out the code is optional, because generating the code is useful without sending it out.

Without laboring over restating features of the methods described above as device or code features, one of skill in the art will understand that the features of the method are also features of the corresponding device or system, both from the server and the requester perspectives.

A requester's device or system receives code adapted to sequentially display a first message and a requested video. The user's computer includes a processor, memory, and a program code in the memory and running on the processor that defines at least two containers. The code is such that a first container is defined to show content in a first format using a first player and a second container is defined to show video content in a second format using a second player. The first container is initially visible and the second container is initially not visible. The first and second containers are coded to appear in overlapping areas of a display monitor when viewed. The configurations of the first and second containers may be substantially the same size and in substantially the same position. Or, they may be in generally the same position. Or they may be in any of the other configurations described above. The program code further includes a first trigger to enable visibility of the second container, such that when the first trigger is satisfied, the second container becomes visible and the first container is at least partially covered by the second container or becomes not visible. The user's computer further includes a module adapted to invoke a first link in the program code to retrieve the requested video, to invoke a second link in the program code to retrieve the supplemental video; and, optionally, to display the requested video and the supplemental content, using the program code.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for sequentially displaying messages in a display window, systems including logic and resources to carry out sequential display of messages in a window, systems that take advantage of computer-assisted display of messages, media impressed with logic to carry out sequential display of messages in a window, data streams impressed with logic to carry out sequential display of messages in a window, especially when the data stream is received in memory or is queued in memory awaiting transmission, or computer-accessible services that carry out computer-assisted sequential display of messages in a window. It is contemplated that modifications and combinations will readily occur to those skilled in the art, which modifications and combinations will be within the spirit of the invention and the scope of the following claims.

We claim as follows:

1. A method of automating sequencing of a requested video and a supplemental video shown by a computer using different players, the method including:
    accessing, from computer memory, a program code that defines at least two HTML containers on a web page in which requested video content and supplemental video content are programmed to be shown, such that a first HTML container of the two HTML containers is defined to show the supplemental video content in a first format in a first video player;

a second HTML container of the two HTML containers is defined to show the requested video content in a second format in a second video player that is a different instantiation than the first video player's instantiation, wherein the second video player is invoked in accordance with the second format, separately than the first video player's instantiation;

wherein the supplemental video content in the first HTML container is initially viewable and the requested video content in the second HTML container is initially not viewable; or the requested video content in the second HTML container is initially viewable and the supplemental video content in the first HTML container is initially not viewable; and configuring a first trigger in the program code to enable viewability of the second initially not viewable HTML container, such that when the first trigger is satisfied, the second initially not viewable HTML container becomes viewable and the first initially viewable HTML container moves behind the second initially not viewable HTML container or becomes not viewable.

2. The method of claim 1, wherein one of the first and second containers of the at least two HTML containers has an area in a range of 100 to 120 percent of the other HTML container.

3. The method of claim 1, wherein one of the first and second containers of the at least two HTML containers has an area in a range of 100 to 125 percent of the other HTML container.

4. The method of claim 1, wherein one of the first and second containers of the at least two HTML containers has an area in a range of 100 to 150 percent of an area of the other HTML container.

5. The method of claim 1, wherein neither of the first and second containers of the at least two HTML containers cover more than half of a web page area of the web page on which the containers are positioned.

6. The method of claim 1, wherein the first HTML container for the supplemental video content has a size and position that leaves video selection controls and user response choices exposed on a web page on which the HTML container that is initially viewable is positioned.

7. The method of claim 1, further including dynamically specifying in the program code a link to the requested video content, responsive to receiving the request.

8. The method of claim 7, wherein the first trigger is a timer value.

9. The method of claim 8, wherein the requested video content and the supplemental video content use separately loaded player codecs to both respectively decode and respectively display the first and second formats.

10. The method of claim 8, wherein the requested video content and the supplemental video content use two instances of a single player application to decode and display the requested and supplemental video contents.

11. The method of claim 8, wherein the timer value is delivered with the program code.

12. The method of claim 8, wherein the timer value is accessible to the program code from a source of a first message that comprises the supplemental video content.

13. The method of claim 7, wherein a first message comprises the supplemental video content and the first trigger is detection of an end of running the first message.

14. The method of claim 1, including:

accessing program code, further including defining a third container that shows third content in a third format using a third player;

setting a second timer value to enable visibility of the third container after the second timer expires; and delivering said program code, further including delivering the second timer.

15. The method of claim 14, further including, after receiving the request and dynamically specifying links to the requested video, dynamically determining at least one of the first and the second timer values a first message comprising the supplemental video content, and a second message comprising third content, all responsive to receiving the request from a user.

16. A server that serves code adapted to display a requested video and a supplemental video and shown by a computer using different players, the server including:

a processor, memory, instructions in the memory and running on the processor that accesses program code that defines at least two containers, such that a first container of the at least two containers is defined to show a first message in a first format using a first player;

a second container of the at least two containers is defined to show a requested video in a second format using a second player and invoked separately than the first video player's instantiation in accordance with the second format, wherein the first container is initially visible and the second container is initially not visible; or the second container is initially visible and the first container is initially not visible; and the first and second containers are coded to appear in a same browser window when viewed by a requester; and the program code further including a first trigger to enable visibility of the initially not visible container, such that when the first trigger is satisfied, the initially not visible container becomes visible and the initially visible container is at least partially covered by the initially not visible container.

17. A non-transitory computer readable medium configured with instructions such that, when the instructions are executed on a processor, cause the processor to perform a collection of steps, the steps comprising:

accessing, from computer memory, a program code that defines at least two HTML containers on a web page in which requested video content and supplemental video content are programmed to be shown, such that a first HTML container of the at least two HTML containers is defined to show the supplemental video content in a first format in a first video player;

a second HTML container of the at least two HTML containers is defined to show the requested video content in a second format in a second video player that is a different instantiation than the first video player's instantiation, and wherein the second video player is invoked in accordance with the second format, separately than the first video player's instantiation;

wherein
- the supplemental video content in the first HTML container is initially viewable and the requested video content in the second HTML container is initially not viewable; or
- the requested video content in the second HTML container is initially viewable and the supplemental video content in the first HTML container is initially not viewable; and configuring a first trigger in the program code to enable viewability of the initially not viewable HTML container, such that when the first trigger is satisfied, the initially not viewable HTML container becomes viewable and the initially viewable HTML container moves behind the initially not viewable HTML container.

18. The non-transitory computer readable medium of claim 17, wherein the first trigger is a timer value.

19. The non-transitory computer readable medium of claim 17, wherein a first message comprises the supplemental video content and the first trigger is detection of an end of running the first message.

20. The non-transitory computer readable medium of claim 17, wherein the requested video content and the supplemental video content use two instances of a single player application to decode and display the requested and supplemental video contents.

* * * * *